United States Patent
Orlik et al.

(10) Patent No.: US 7,555,004 B2
(45) Date of Patent: Jun. 30, 2009

(54) COORDINATING COMMUNICATIONS IN A HETEROGENEOUS COMMUNICATIONS NETWORK USING DIFFERENT SIGNAL FORMATS

(75) Inventors: Philip Orlik, Cambridge, MA (US); Andreas Molisch, Arlington, MA (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 955 days.

(21) Appl. No.: 10/774,200

(22) Filed: Feb. 6, 2004

(65) Prior Publication Data

US 2005/0174964 A1    Aug. 11, 2005

(51) Int. Cl.
*H04L 12/413*    (2006.01)
*H04L 12/28*    (2006.01)
*H04L 12/56*    (2006.01)
*H04W 4/00*    (2009.01)

(52) U.S. Cl. .................. 370/445; 370/389; 370/329

(58) Field of Classification Search ................ 370/445, 370/317, 335–338, 252, 254, 329, 389, 310.2, 370/322, 328, 204, 208, 264, 265
See application file for complete search history.

(56) References Cited

U.S. PATENT DOCUMENTS

| 6,754,176 | B1 * | 6/2004 | Gubbi et al. ................ 370/230 |
| 7,136,361 | B2 * | 11/2006 | Benveniste .............. 370/310.2 |
| 7,180,905 | B2 * | 2/2007 | Benveniste .................. 370/445 |
| 7,274,707 | B2 * | 9/2007 | Choi et al. .................. 370/445 |

* cited by examiner

*Primary Examiner*—Eugene Yun
(74) *Attorney, Agent, or Firm*—Dirk Brinkman; Gene Vinokur

(57) ABSTRACT

A method communicates data between terminals in heterogeneous communications network. A coordinator broadcasts periodically a first beacon in a first signal format. The first beacon defines a start of a contention period and a start of a contention free period. The coordinator also broadcasts a second beacon in a second signal format during the contention free period. The second beacon also defines the start of the contention period and the start of the contention free period.

12 Claims, 3 Drawing Sheets

COORDINATING COMMUNICATIONS IN A HETEROGENEOUS COMMUNICATIONS NETWORK USING DIFFERENT SIGNAL FORMATS

FIELD OF THE INVENTION

This invention relates generally to communication systems, and more particularly networks where terminal nodes are controlled by a coordinator node.

BACKGROUND OF THE INVENTION

In wireless communication networks, common network topologies are that of a star or a cluster. In a star network, all terminal nodes communicate with each other via a central node called a coordinator. The coordinator receives signals from transmitting nodes and forwards the signal to receiving nodes. In a cluster network, all terminals communicate directly with each other. In both star and cluster networks it is still necessary to enforce a channel access methodology in order to efficiently utilize the network bandwidth. The main purpose of the coordinator is to determine and broadcast a channel access schedule to the network terminals.

There is a need for a heterogeneous network because of the large number of disparate radio devices that can use a given frequency band. This is clearly a problem in unlicensed radio frequency bands. In the United States, unlicensed bands are known as ISM, and are centered around 2.4 GHz and 5 GHz. In the rest of the world, similar bands are used.

In the 5 GHz band, for example, radio terminal can conform to various IEEE 802 standards. Ultra-wide bandwidth (UWB) terminals may not conform to any standard. Enabling a coordinated channel access mechanism for such terminals could improve bandwidth utilization by reducing interference. More importantly, the cost of the terminals can be reduced if for some applications only a simple low bit rate radio is needed to satisfy the communication bit rate requirements. Then, an existing high-speed network, such as the one defined in the IEEE 802.15.3a standard, could incorporate cheaper low bit rate terminals and offer coordination and channel access services. Such a scenario would eliminate the need for a separate network for low bit rate terminals.

SUMMARY OF THE INVENTION

The invention provides a method for incorporating various types of radio terminals in a shared medium wireless or wired network. The terminals can use vastly different formats for signaling, yet share the same frequency band.

A coordinator is capable of communicating with all terminals in the network. The coordinator determines a channel access schedule, and broadcasts the channel access schedule, as well as other pertinent network information.

The invention enables the coordination of channel access among multiple different terminals that would normally not have the ability to cooperate due to incompatible signal formats.

Additionally, the invention allows indirect communication between the different terminals via the coordinator.

DETAILED DESCRIPTION OF THE PREFERRED EMBODIMENT

Network Structure

Figure 1:
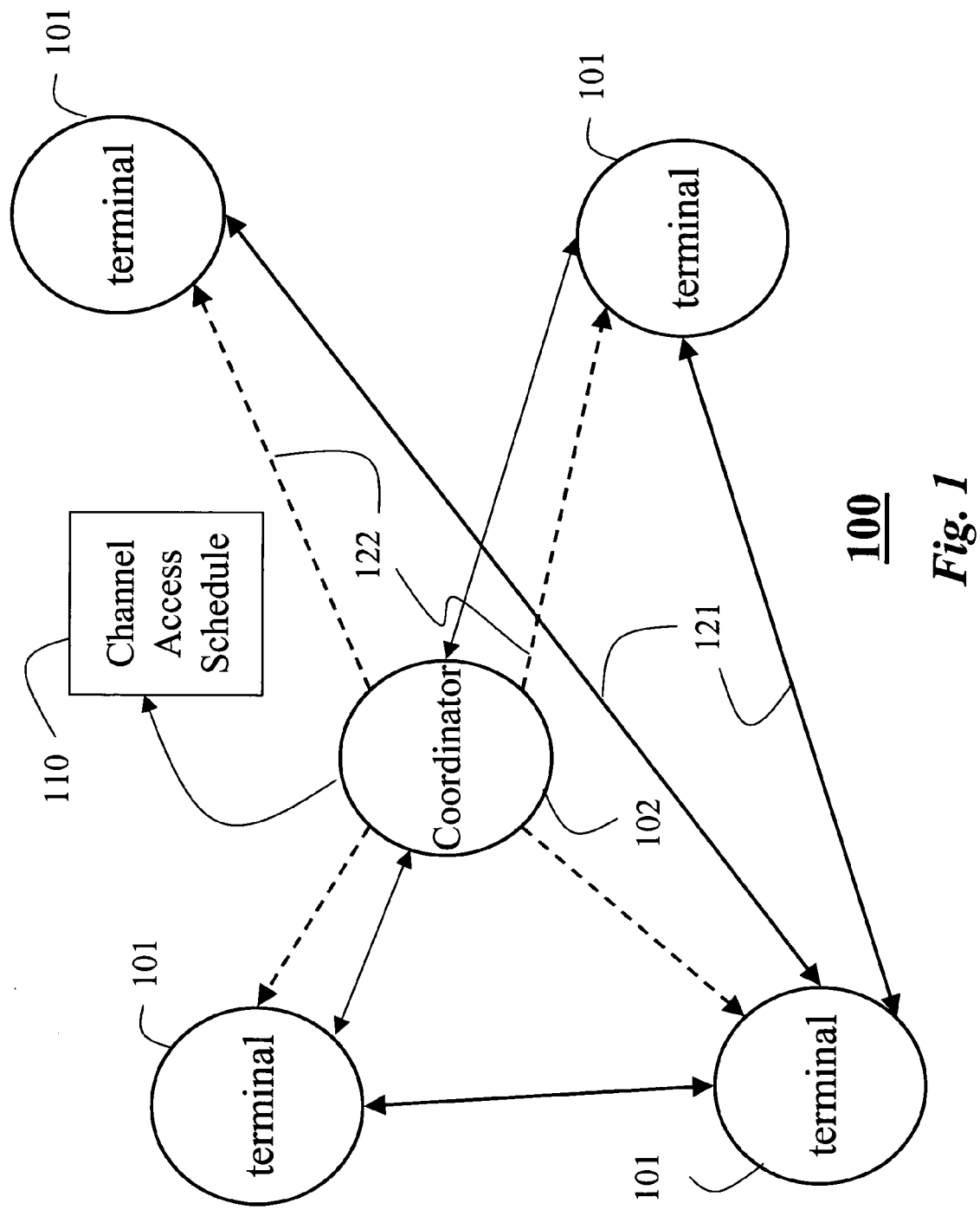
FIG. 1 is a block diagram of a heterogeneous wireless network according to the invention.

As shown in FIG. 1, a heterogeneous, wireless or wired communication network 100 according to the invention includes multiple terminal nodes 101 and a coordinator node 102. The transmitted signals of all of the terminals 101 and the coordinator 102 share the same frequency band, even though the terminals can use different signal formats that are incompatible with each other. The terminals exchange data 121 (solid lines). The exchange can be direct between terminals that use the same signal format, and indirect via the coordinator, between terminals that use different signal formats.

The coordinator can receive and transmit signals in any of the multiple different signal formats, and can therefore communicate data with all terminals. Thus, communication can occur between any terminal and the coordinator, or between two terminals that use the same signal format.

The coordinator as described below determines a channel access schedule 110. The access schedule determines when and how terminals can access the channel. The access schedule is broadcast by the coordinator using a beacon 122, described in greater detail below.

Network Operation

The operation of the coordinator is well defined for networks operating according to the IEEE 802.15.3 and IEEE 802.15.4 standards, see "IEEE Standard for Information technology—Telecommunications and information exchange between systems—Local and metropolitan area networks: *Specific requirements Part 15.3: Wireless Medium Access Control (MAC) and Physical Layer (PHY) Specifications for High Rate Wireless Personal Area Networks (WPANs),*" 2003, and IEEE Standard for Information technology—Telecommunications and information exchange between systems—Local and metropolitan area networks—"*Specific requirements Part 15.4: Wireless Medium Access Control (MAC) and Physical Layer (PHY) Specifications for High Rate Wireless Personal Area Networks (WPANs),*"2003.

In these standard networks, the coordinator determines network parameters, i.e., logical channels, network identifiers, and the channel access schedule for the terminals in the network. The coordinator broadcasts periodically the 'beacon' signal 122 (dashed lines) periodically, that contains the information needed by terminals that desire to access the network.

Frame Structure

Figure 2:
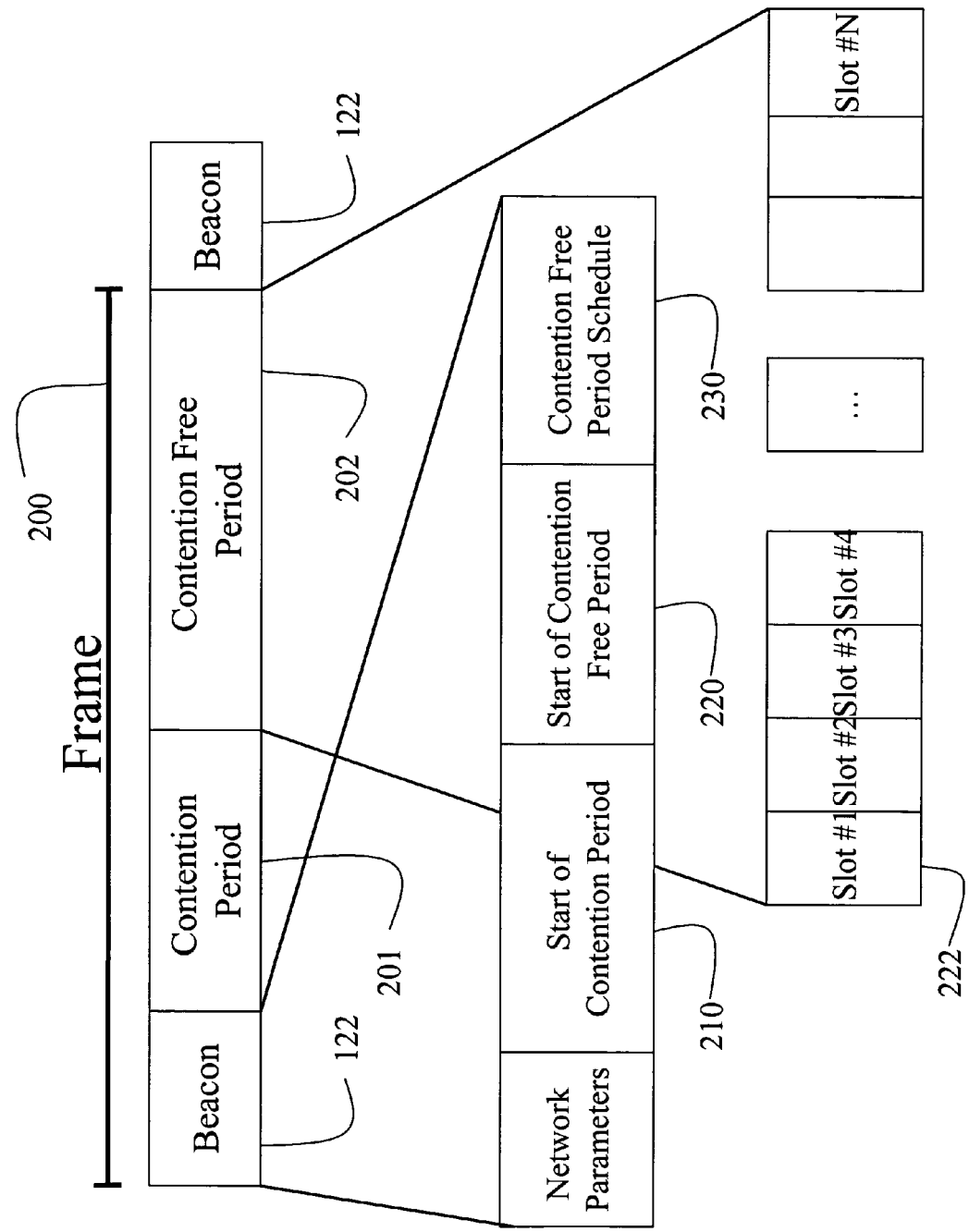
FIG. 2 is a block diagram of a prior art frame structure used by the terminals of the network of FIG. 1.

As shown in FIG. 2, the period between successive beacon signals 122 is called a frame 200. The frame 200 includes the beacon, a contention period 201 and a contention free period 202. In the prior art, the signal format used for the data 121 and the beacon 122 is identical for all terminals.

In the prior art, the beacon defines a start of a contention period 210, a start of a contention free period 220, and a contention free period schedule 230 of slot assignment within the contention free period 202. During the contention period, any terminal can attempt to access the channel. During the contention free period, terminals access the channel only according to a strict schedule to guarantee interference free data transmissions.

Thus, the time between successive beacons is divided into two general channel access periods, the contention period 201 and the contention free period 202.

During the contention period 201, the terminals compete with each other to send data 121. Typically, a random access method such as Aloha or CSMA is used. It is important to note that during the contention period, data reception cannot be guaranteed due to possible interference from other terminals accessing the channel at the same time. Therefore, the general use for the contention period is to allow terminals that have not yet joined the network an opportunity to transmit a request to join the network. Additionally, terminals can request a 'reservation' for their own data transmissions in the contention free period 202 during the contention period 201.

The contention free period 202 is a portion of time between beacons that is reserved for time division multiple access (TDMA). Therefore, the contention free period 202 is partitioned into slots 240 when each terminal can transmit data after receiving permission and an indication of which slot or slots to use for data transmissions from the coordinator 102. This indication is included in the beacon and is usually in the form of the schedule 230 indicating which devices have been assigned to which slots in the contention free period 202.

During the contention free period, each terminal accesses the channel and transmits data 121 according to the schedule 230 broadcast within the beacon.

The above procedure assumes that all terminals are capable of receiving and decoding the beacon broadcast by the coordinator.

Heterogeneous Network

The invention enable the heterogeneous network 100 with terminals that use different physical layers, i.e., different, and perhaps, incompatible signal formats. The coordinator is capable of communicating with any terminal using any of the signal formats, and to convert any one signal format to any other signal format.

In the heterogeneous network 100, a single beacon is not sufficient to coordinate the activities of all the terminals because some terminals may not be capable to transmit and receive according to a particular signal format.

Take the simple case of two terminals, e.g., type A and type B. In this case, the only one of the two terminal can decode the prior art beacon.

Therefore, the coordinator according to the invention broadcasts the beacon twice, first in a signal format for terminal type A, and second in a format for terminal type B. Additional beacons can be broadcast for other signal formats as needed.

Heterogeneous Frame Structure

Figure 3:
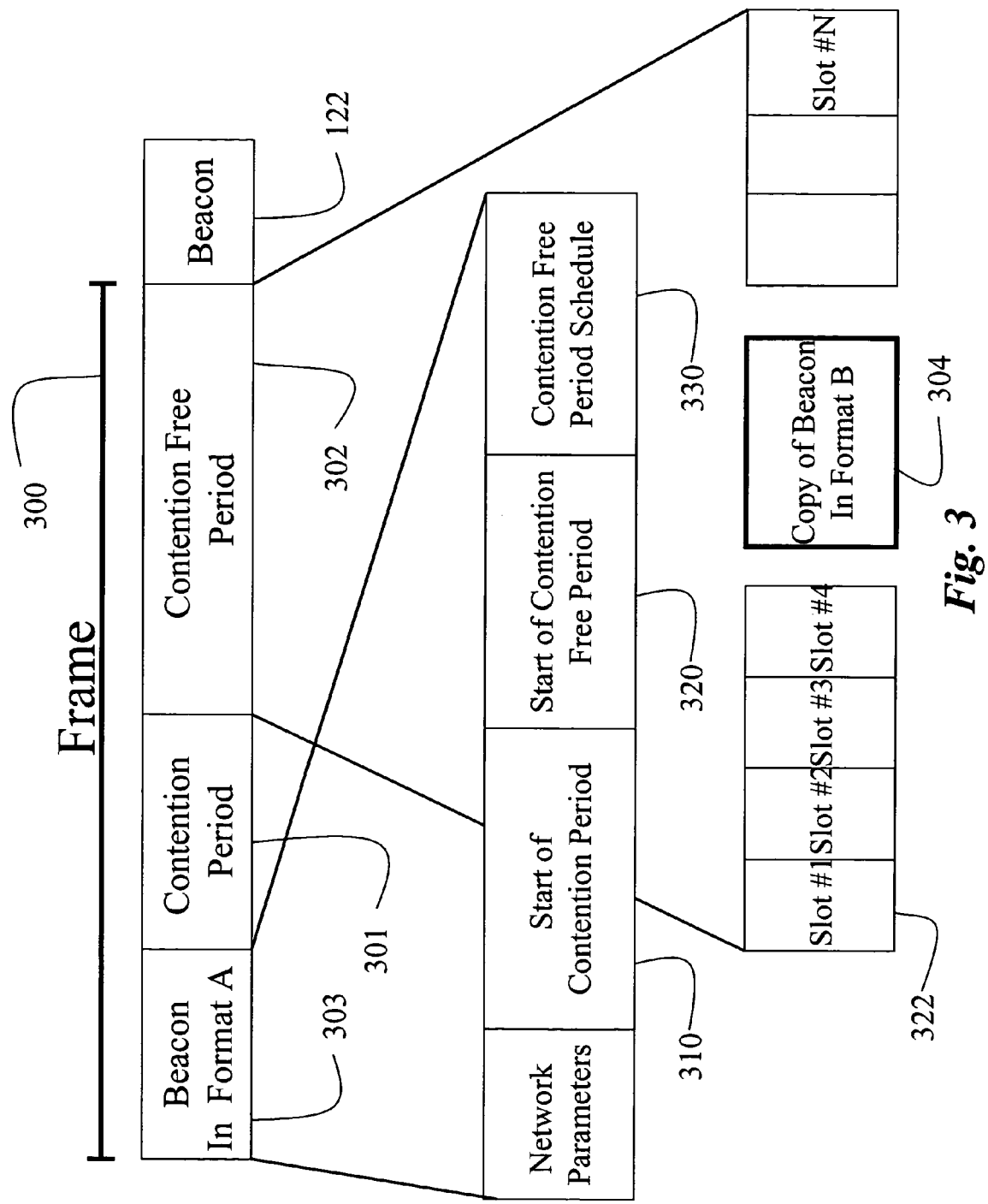
FIG. 3 is a block diagram of frame structure for a heterogeneous network including different terminals according to the invention.

As shown in FIG. 3, a frame 300 includes a first beacon 303, and a contention period 301 and a contention free period 302. The coordinator determines initially the frame structure 300, assuming that only one terminal is present in the network, for example, the terminal type A. Then, the coordinator determines a start of the contention period 310, a start of the contention free period 320, and allocates slots 322 within the contention free period 302 to terminals of type A so as to satisfy requests for contention free data transmissions.

It is important to note that the coordinator can give preference to a particular type of terminal.

By allocating frame resources to terminals of different types, the coordinator controls a proportion of time that these terminals can access the channel. It is reasonable to assume that different terminal types have different bandwidth efficiencies. Therefore, the coordinator can allocate more time within a frame to terminals that are more efficient. Alternatively, efficient terminals can be assigned a higher priority if applications of those terminals are time-critical.

In any case, the initial frame structure can use the signal format of terminals with a highest priority, e.g., the format for terminals of type A.

Continuing with the above example, where now, the coordinator has the initial frame structure. At this point the coordinator can broadcast a second beacon 304, whose content is a copy of the first beacon 303, during the contention free period by assigning one or more slots to the coordinator itself. In this instance, the format for terminals of type B is used.

This decision can be based on the number terminals of each type in the network, or the number of contention free slots 322 already allocated.

If a necessary number of slots remain unassigned, then the copy of the beacon 304 is transmitted during a previously unassigned portion of the contention free period 302. This beacon is broadcast in the signal format for type B terminals.

Because the copy of the beacon copy is broadcast during the contention free period type, Type A terminals ignore signals during unassigned slots, while type B terminals receive and decode the copy of the beacon 304. Thus, type B terminals can also acquire the frame 300, so that those terminals can join the network to send data requests to the coordinator during the contention period 301.

Essentially, the invention allows the use of resources that are not used by one terminal type to be used by the other terminal types within the network. Additional terminal types can be support by the coordinator if remaining transmission time is available within a frame. That is, additional copies of the beacon, in other signal formats, can be broadcast by the coordinator.

It should be noted that the terminals using different signal formats can communicate indirectly, via the coordinator. In this case, the coordinator converts from one signal format to another. It should also be noted, that the same method can be used on a wired channel where the frequency band is shared by all attached terminals.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for communicating data between terminals in heterogeneous communications network, comprising:

broadcasting periodically a first beacon in a first signal format, the first beacon defining a start of a contention period and a start of a contention free period, the contention free period for communicating data between the terminals; and broadcasting a second beacon in a second signal format, which is different from the first signal format, during the contention free period, the second beacon defining the start of the contention period and the start of the contention free period.

2. The method of claim 1, in which the contention free period includes assigned and unassigned slots, and in which the second beacon is broadcast during time periods of unassigned slots.

3. The method of claim 1, further comprising:

broadcasting a plurality of second beacons in a plurality of different signal formats during the contention free period.

4. The method of claim 1, in which the first signal format is predetermined.

5. The method of claim 1, in which the first signal format is based on a priority of terminals in the heterogeneous network.

6. The method of claim 1, in which the first signal format is based on a bandwidth of terminals in the heterogeneous network.

7. The method of claim 2, in which the slots are assigned according to a bandwidth of terminals in the heterogeneous network.

8. The method of claim 2, in which the slots are assigned according to a priority of terminals in the heterogeneous network.

9. The method of claim 1, in which terminals of the heterogeneous network share a single frequency band.

10. A heterogeneous communication network, comprising: a first terminal communicating according to a first signal format; a second terminal communicating according to a second signal format; a coordinator configured to broadcast periodically a first beacon in the first signal format, the first beacon defining a start of a contention period and a start of a contention free period, and configured to broadcast a second beacon in the second signal format, which is different from the first signal format, during the contention free period, the second beacon defining the start of the contention period and the start of the contention free period.

11. The network of claim 10, in which the coordinator can communicate with any terminal in the network in any predetermined signal format.

12. The network of claim 10, in which the first and second terminal communicate indirectly with each other via the coordinator terminals.

\* \* \* \* \*